April 17, 1951 C. GERST 2,549,078
MULTIPLE CLUTCH MECHANISM
Filed Feb. 15, 1947 3 Sheets-Sheet 1
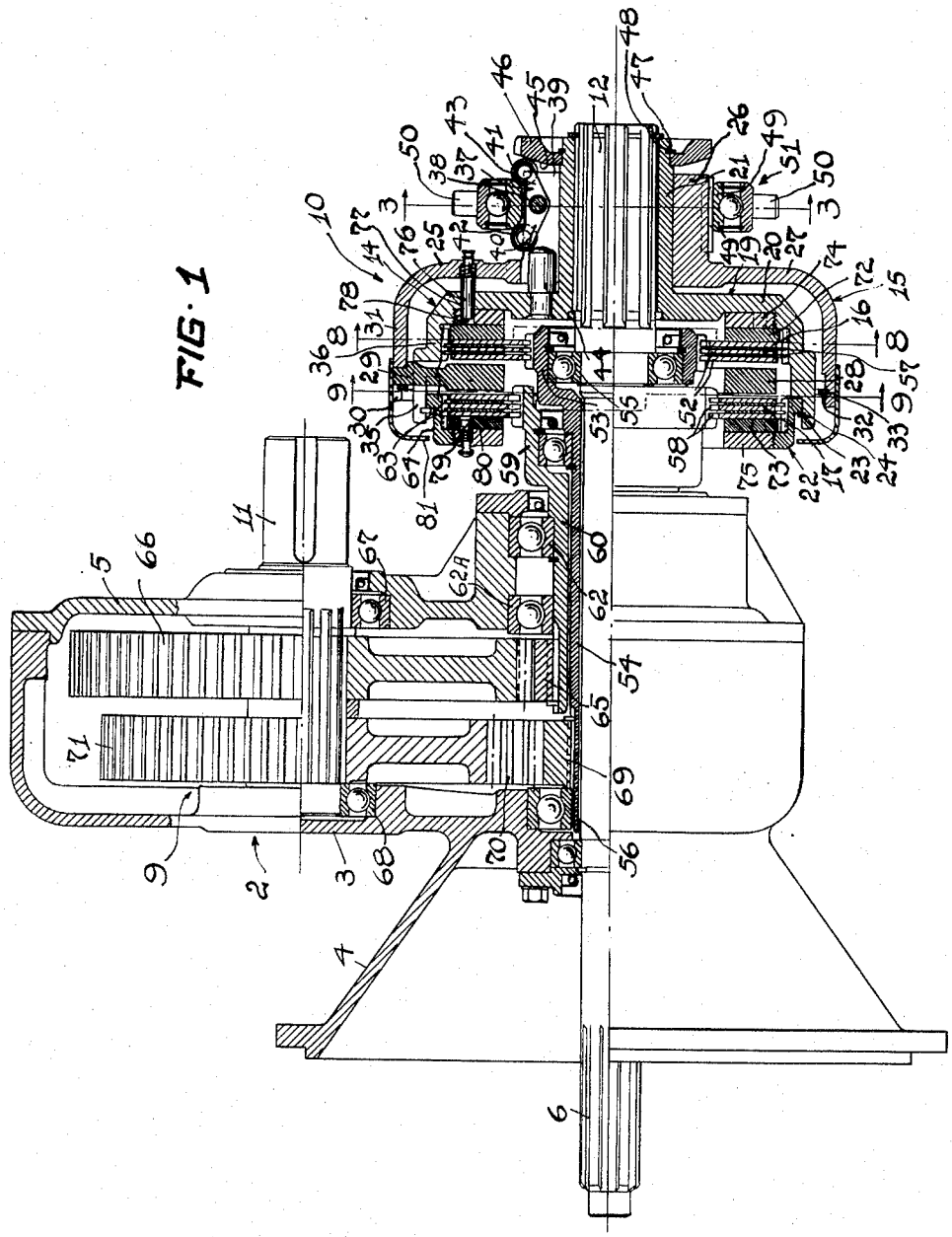
INVENTOR.
CHRIS GERST
BY
Gustav A. Wolff
ATT.

April 17, 1951     C. GERST     2,549,078
MULTIPLE CLUTCH MECHANISM
Filed Feb. 15, 1947     3 Sheets-Sheet 2
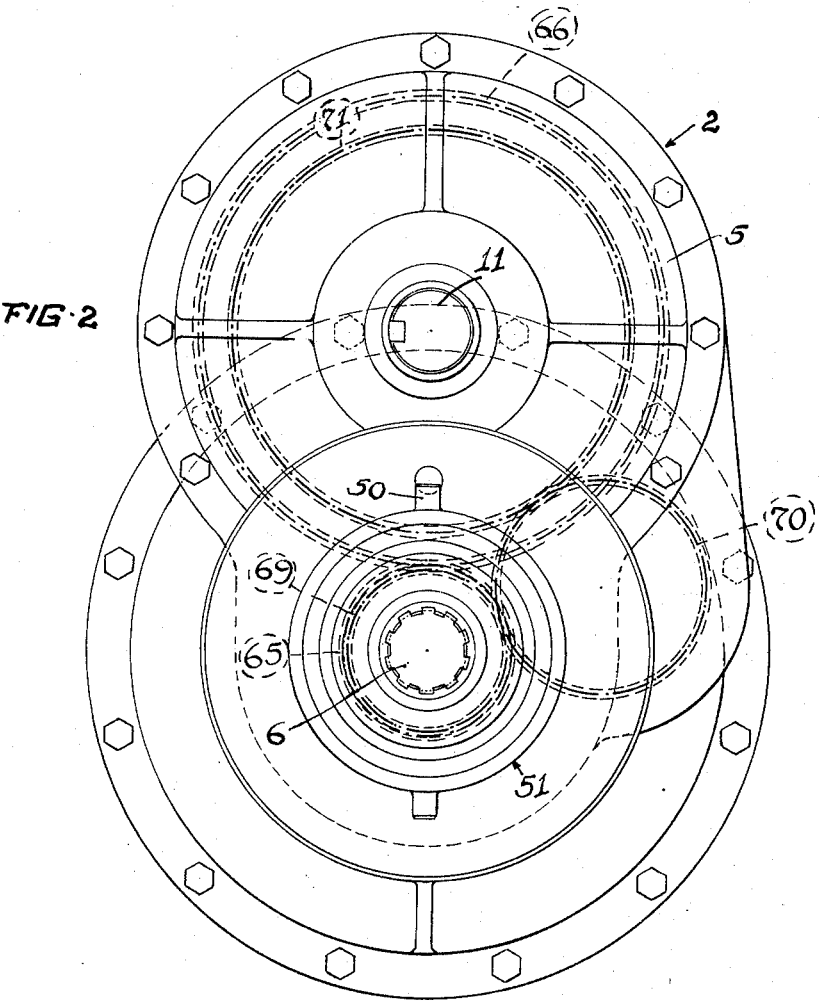
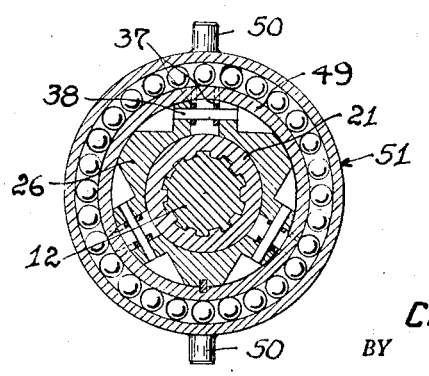
INVENTOR.
CHRIS GERST April 17, 1951        C. GERST        2,549,078
MULTIPLE CLUTCH MECHANISM
Filed Feb. 15, 1947        3 Sheets-Sheet 3
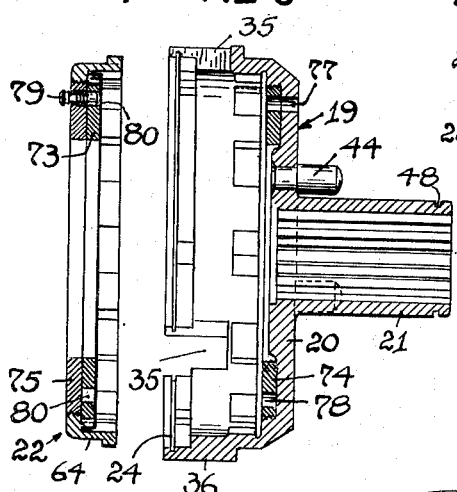
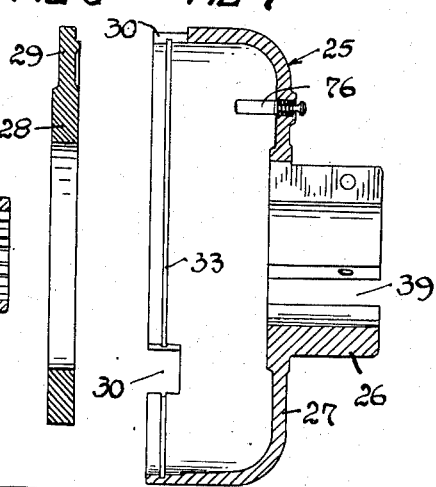
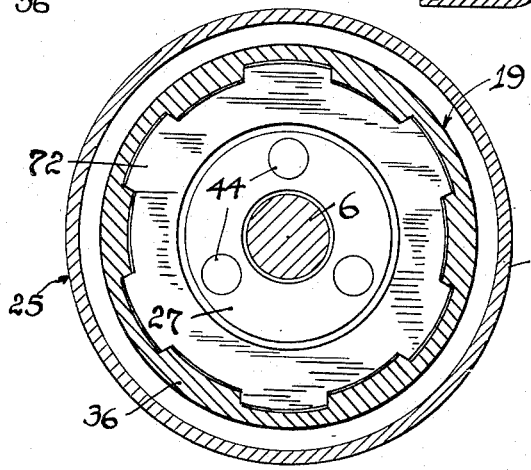
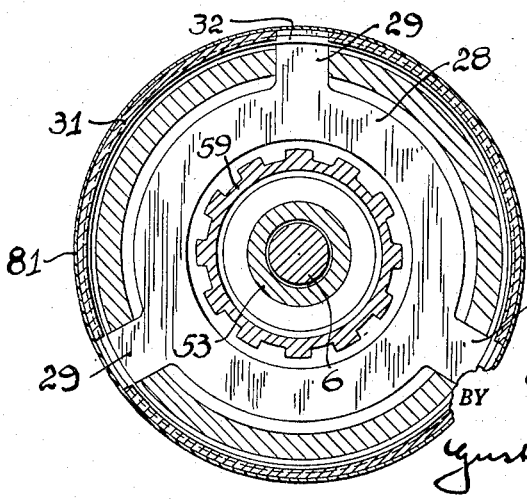
INVENTOR.
CHRIS GERST
BY
Gustav A. Wolff
ATT.

Patented Apr. 17, 1951

2,549,078

UNITED STATES PATENT OFFICE 2,549,078

MULTIPLE CLUTCH MECHANISM

Chris Gerst, Detroit, Mich., assignor to The Transmission & Gear Company, Dearborn, Mich., a corporation of Michigan Application February 15, 1947, Serial No. 728,843

10 Claims. (Cl. 192—48)

This invention relates in general to friction clutches in which independently rotatable driving and driven members are coupled with each other by a plurality of friction disks brought into frictional cooperation by clamping the disks between backing and clamping plates, and, more particularly, is concerned with improvements in two-way friction clutches of the above type especially suitable for use with two ratio or reversible transmissions such as marine transmissions, mixer transmissions, etc.

The primary object of the present invention is the provision of an improved two-way friction clutch of the positive locking type which includes a backing plate structure with two laterally spaced backing plates and a single shiftably mounted clamping plate arranged to actuate in cooperation with the backing plate structure either of two clutch disk assemblies to permit forward or reversed rotation of the driven shaft of a transmission or quick and effective change of the drive ratio of such driven shaft by shifting of the two-way friction clutch instead of shifting the gears of the transmission.

Another object of the invention is the provision of an improved two-way friction clutch of the positive locking type which includes a backing plate structure with two laterally spaced backing plates and a clamping plate structure axially shiftably and non-rotatably engaged with the backing plate structure, so that the clamping plate of the clamping plate structure is positioned between the backing plates and permits selective actuation of either of two clutch disk assemblies arranged between the backing plates in symmetrical relation with respect to the clamping plate for rotation of either a shaft by the one clutch disk assembly or a quill surrounding such shaft by the other one clutch disk assembly.

A further object of the invention is the provision of an improved two-way friction clutch which includes a backing plate structure with two laterally spaced, individually adjustably mounted backing plates and a clamping plate structure with a single clamping plate, which clutch has its backing plate structure axially slidably and non-rotatably interengaged with the clamping plate structure, and which clutch includes on its backing plate structure and clamping plate structure cooperative means permitting shifting of said clamping plate structure for selective actuation of either of two clutch disk assemblies arranged in the backing plate structure between its adjustably mounted backing plates.

Still another object of the invention is the provision of an improved two-way friction clutch which includes a backing plate structure in which a housing adjustably mounts two oppositely arranged, laterally spaced backing plates and a clamping plate structure in which a cup-shaped housing mounts a single clamping plate, which clutch has the two housings non-rotatably and axially shiftably interengaged with each other and has the clamping plate arranged in the housing of the backing plate structure between the backing plates thereof, and which clutch has extended from both of said housings hub portions slidably engaged with each other and provided with cooperating means adapted to effect axial shifting of the housings with respect to each other.

With the above and other incidental objects in view, the invention has other marked improvements and superiorities which radically distinguish it from presently known structures. These improvements or superior characteristics embodying certain novel features of construction are clearly set forth in the appended claims, and a preferred embodiment of the invention is hereinafter shown with reference to the accompanying drawings forming part of the specification.

In the drawings:

Fig. 1 is a longitudinal sectional view through a reversible transmission coupled with a two-way clutch structure according to the invention adapted to effect direct or reversed rotation of the output shaft of the transmission.

Fig. 2 is a front view of the transmission and clutch arrangement shown in Fig. 1.

Fig. 3 is a cross sectional view through the clutch structure shown in Fig. 1, the section being taken on line 3—3 of Fig. 1.

Figs. 4 through 7 show the backing plate structure and the clamping plate structure of the two-way clutch in partly disassembled condition, thus Fig. 4 is a longitudinal sectional view through the cover member of the backing plate structure;

Fig. 5 is a longitudinal sectional view through the body member of the backing plate structure;

Fig. 6 is a longitudinal sectional view through the clamping plate of the clamping plate structure, and Fig. 7 a longitudinal sectional view through the clamping plate supporting member of the clamping plate structure.

Fig. 8 is a cross sectional view through the two-way clutch structure shown in Fig. 1, the section being taken on line 8—8 of said figure; and Fig. 9 is another cross sectional view through the two-way clutch structure shown in Fig. 1, the section being taken on line 9—9 of said figure.

Referring now more particularly to the transmission and clutch structure shown in the drawings, reference numeral 2 denotes a transmission which embodies a main housing 3 provided at its rear end with a bell housing 4 and closed at its front end by a cover member 5. Housing 3 mounts an input shaft 6 coupled by means of gearing 9 and a two-way clutch mechanism 10 with an output shaft 11. This two-way clutch mechanism, which is supported on the splined front portion 12 of input shaft 6, embodies a backing plate structure 14 with two laterally spaced backing plates and a clamping plate structure 15 with a single clamping plate. Structures 14 and 15 are axially slidably and non-rotatably interengaged with each other to permit selective coupling of input shaft 6 with output shaft 11 by either of two individual clutch disk assemblies 16 and 17 arranged within backing plate structure 14 at opposite sides of the clamping plate, as will be later described.

The backing plate structure includes a cup-shaped body 19 having extended from its rear wall 20 an internally splined hub 21 non-rotatably slidably engaged with the splined front portion 12 of input shaft 6. Body 19 carries at its one end a ring-shaped, flanged cover member 22 extended into the body and non-rotatably engaged therewith and which is held in position by a locking ring 23 seated in a groove 24 of said body. The clamping plate structure 15 includes a cup-shaped body 25 dimensioned to permit free extension of body 19 thereinto. Body 25, which has extended from its rear wall 27 a slotted hub member 26 slidably engaged with the hub 21 of backing plate structure 14, mounts non-rotatably secured to body 25 a ring-shaped plate 28 with radial driving lugs 29. These lugs extend into slots 30 in the circumferential wall 31 of body 25 and are held in position by a locking ring 32 seated in a groove 33 of body 25. The backing plate structure has its body 19 partly extended into the body 25 of the clamping plate structure so that the clamping plate 28 is generally positioned in body 19 and driving lugs 29 are extended through slots 35 in the circumferential wall 36 of body 19 to permit engagement of these lugs with the slots 30. This relationship of structures 14 and 15 provides a clutch structure with a single clamping plate and two laterally spaced backing plates. Shifting of the clamping plate structure 15 with respect to backing plate structure 14 is effected by a plurality of dual clutch levers 37 which are pivoted on pins 38 bridging the slots 39 in slotted hub member 26. These dual clutch levers each embody symmetrically arranged, oppositely extended arms 40 and 41 pivotally supporting rollers 42 and 43. The rollers 42 cooperate with studs 44 attached to the rear wall 20 of body 19 and extended into slots 39, and the rollers 43 cooperate with the inclined wall 45 of a collar member 46 sleeved upon the end portion of hub 21 and secured thereto by a locking ring 47 seated in a groove 48 in hub 21. Actuation of levers 37 causes shifting of the clamping plate structure 15 and such actuation is effected by the inner race member 49 of a ball bearing 51 which acts as a shifting collar for levers 37 and includes a pair of oppositely arranged trunnions 50 to permit direct coupling of the ball bearing with a shifting fork of common construction (not shown).

Clutch disk assembly 16 consists of friction driven disks 52 non-rotatably and axially shiftably secured to the enlarged, splined end portion 53 of driven sleeve member 54 which is axially aligned with input shaft 6 and mounted in bearings 55, 56, and friction driving disks 57 non-rotatably and axially shiftably secured to the internally toothed circumferential wall 36 of body 19. Clutch disk assembly 17 consists of friction driven disks 58 non-rotatably and axially shiftably secured to the enlarged, splined end portion 59 of a second driven sleeve member 60 which is axially aligned with sleeve member 54 and input shaft 6 and mounted in bearings 62, 62ᴬ, and friction driving disks 63 non-rotatably and axially shiftably secured to the internally toothed flange 64 of cover member 22.

Sleeve member 60 mounts on its rear end a pinion 65 which is in constant mesh with a gear 66 secured to output shaft 11 journalled in ball bearings 67, 68 in housing 3, and sleeve member 54, the reverse drive sleeve, mounts on its rear end a pinion 69 which is in constant mesh with an idler gear 70 meshing a gear 71 secured to output shaft 11. This arrangement permits simple reversing of rotation of output shaft 11 by operation of the two-way clutch structure without engagement or disengagement of gears.

The backing plate structure 14 is provided with removable and axially shiftable backing plates 72, 73 which directly engage the two clutch disk assemblies 16 and 17. These backing plates are non-rotatably and axially slidably connected to body 19 and cover member 22, respectively, and, for such purpose, include peripheral teeth which engage the internally toothed circumferential wall 36 of body 19 and the internally toothed flange 64 of cover member 22, respectively. This mounting of the backing plates provides a medium for adjusting the clutch structure when the friction disks of the clutch disk assemblies 16 and 17 wear and it becomes necessary to readjust the initial position of the backing plates owing to the fixed range of movement of lever arms 40 and 41. To permit adjustment of the backing plates 72 and 73, these plates are backed up by backing rings 74, 75 which are threadedly connected with body 19 and cover member 22, respectively. Backing plate 72 is adjusted by rotation of backing ring 74 which is held in adjusted position by a spring-pressed plunger 76 mounted in the rear wall 27 of cup-shaped body 25 and extended through a bore 77 in wall 20 of body 19 into one of a plurality of circumferentially disposed holes 78 in backing ring 74. Backing plate 73 is adjusted by rotation of backing ring 75 which is held in adjusted position by a spring-pressed plunger 79 mounted in backing ring 75 and extended into one of a plurality of circumferentially disposed holes 80 in the non-rotatable and axially shiftable backing plate 73.

The thus described clutch structure, which includes a sheet metal cover member 81, is constructed and designed to be located on the outside of a transmission or supporting housing so as to be readily and easily accessible for adjustment and repair.

In describing the operation of the improved clutch structure it will be assumed that, as shown in Fig. 1, the clamping plate structure is in neutral position and that input shaft 6 and hence all elements of the clutch structure except friction driven disks 52 and 58, are rotating. If it is desired to directly drive output shaft 11, ball bearing 51 is shifted toward the right to cause a movement of levers 37 so that rollers 43 on lever arms 41 engage the inclined wall 45 of collar 46 and effect axial movement of the clamping plate structure until the disks of clutch disk assembly 17 are locked with each other so that sleeve 60 by its pinion 65 rotates gear 66 secured to output shaft 11. A reverse drive is transmitted to output shaft 11 when ball bearing 51 is moved toward the left to cause a movement of levers 37 so that rollers 42 on lever arms 40 engage the studs 44 on the rear wall of body 19 of backing plate structure 14 and effect axial movement of the clamping structure until the disks of clutch disk assembly 16 are locked with each other and sleeve 54 by its pinion 69 and idler gear 70 rotates gear 71 also secured to output shaft 11.

Having thus described my invention, what I claim is:

1. In clutch mechanism, a drive member, a pair of clutches, a backing plate structure rigidly secured to said drive member and including a housing adjustably mounting therein backing plates arranged in laterally spaced relation with respect to each other, a shiftable clamping plate structure including a housing mounting at its one end a clamping plate, said two housings being non-rotatably and axially shiftably interengaged with each other by the clamping plate of said clamping plate structure and partly extended into each other to position the clamping plate between said backing plates, tiltable lever means directly pivotally mounted on the housing of said clamping plate structure, and means mounted on the housing of said backing plate structure opposite said tiltable lever means for cooperation with said lever means in shifting the clamping plate structure in opposite directions for selective actuation of either one of said clutches.

2. A clutch mechanism such as described in claim 1, wherein the backing plates of said backing plate structure are non-rotatably and axially shiftably mounted in its housing and wherein there are provided backing rings threadedly engaged with said housing to back up said backing plates and adjust their position with respect to each other.

3. A clutch mechanism such as described in claim 1, wherein the housing of said backing plate structure is smaller in diameter than the housing of said clamping plate structure and partly extended thereinto, wherein both housings include intersleeved hub portions, wherein said tiltable lever means is pivotally mounted on the hub portion of the clamping plate structure, and wherein the hub portion of the clamping plate structure is sleeved upon the hub portion of the backing plate structure.

4. A clutch mechanism such as described in claim 1, wherein the said housings of said backing plate and clamping plate structures include hub portions and the hub portion of the clamping plate structure is sleeved on the hub portion of the backing plate structure, and wherein the hub portion of said clamping plate structure is slotted and has said tiltable lever means extended into its slotted portion.

5. A clutch mechanism such as described in claim 1, wherein the backing plates of said backing plate structure are non-rotatably and axially shiftably mounted in its housing, wherein there are provided backing rings threadedly engaged with said backing plate structure housing to back up said backing plates and adjust their position with respect to each other, and wherein means are provided to lock said backing rings in their adjusted positions.

6. A clutch mechanism such as described in claim 1, wherein the backing plates of said backing plate structure are non-rotatably and axially shiftably mounted in its housing, wherein there are provided backing rings threadedly engaged with said backing plate structure housing to back up said backing plates and adjust their position with respect to each other, wherein means are provided to lock said backing rings in their adjusted positions, and wherein one of said means is mounted in one of the backing rings and the other one of said means is mounted in the housing of said clamping plate structure.

7. A clutch mechanism such as described in claim 1, wherein the housing of said backing plate structure is smaller in diameter than the housing of said clamping plate structure and partly extended thereinto, wherein both housings include hub portions and the hub portion of the clamping plate structure is sleeved on the hub portion of the backing plate structure, wherein the hub portion of said clamping plate structure is slotted and has said tiltable lever means extended in its slotted portion, and wherein the housing and the hub portion of said backing plate structure include means cooperating with said tiltable lever means in shifting the clamping plate structure in opposite directions to engaging positions of its clamping plate with either one of said clutches for actuating same.

8. In clutch mechanism a drive member, a pair of clutches, a backing plate structure rigidly secured to said drive member and including a housing adjustably mounting therein laterally spaced backing plates for said pair of clutches, a shiftable clamping plate structure common to both clutches including a housing mounting a clamping plate arranged between the backing plates of said backing plate structure, dual lever means directly pivotally mounted on one end of the housing of the clamping plate structure, and laterally spaced means mounted on one end of the housing of said backing plate structure opposite said dual lever means for cooperating therewith in shifting the clamping plate structure in opposite directions for selective actuation of either one of said pair of clutches.

9. In clutch mechanism a drive member, a pair of clutches, a backing plate structure rigidly secured to said drive member and including a housing adjustably mounting therein laterally spaced backing plates for said pair of clutches, a shiftable clamping plate structure common to both clutches axially shiftably and non-rotatably engaged with the housing of said backing plate structure and extended into said housing between the backing plates therein, dual lever means directly pivotally mounted on the clamping plate structure, and spaced means mounted on the housing of said backing plate member opposite said dual lever means for cooperation therewith in shifting the clamping plate structure in opposite directions for selective actuation of either one of said pair of clutches.

10. In clutch mechanism, a drive member and a pair of clutches including jointly a backing plate structure rigidly secured to said drive member and provided with laterally spaced backing plates, a clamping plate structure with a housing mounting a clamping plate and shiftable in opposite directions to engage either clutch, dual lever means directly pivotally mounted on one end of the housing of the clamping plate structure, and laterally spaced means mounted on said backing plate structure opposite said dual lever means for cooperation therewith in shifting the clamping plate structure in opposite directions to engaging positions for selective actuation of either one of said pair of clutches.

CHRIS GERST.

REFERENCES CITED

The following references are of record in the file of this patent:

UNITED STATES PATENTS

| Number | Name | Date |
|---|---|---|
| 2,099,141 | Railton et al. | Nov. 16, 1937 |
| 2,125,433 | Dunkelow | Aug. 2, 1938 |
| 2,136,811 | Burtnett | Nov. 15, 1938 |
| 2,168,960 | Morris | Aug. 8, 1939 |
| 2,229,910 | Adamson et al. | Jan. 28, 1941 |
| 2,315,808 | Miller | Apr. 6, 1943 |
| 2,392,719 | Barrow | Jan. 8, 1946 |
| 2,407,319 | Miller | Sept. 10, 1946 |
| 2,462,457 | Berndtson | Feb. 22, 1949 |